A. W. BALLOU.
Improvement in Dowel Hoops for Cooperage.
No. 124,656.            Patented March 19, 1872.
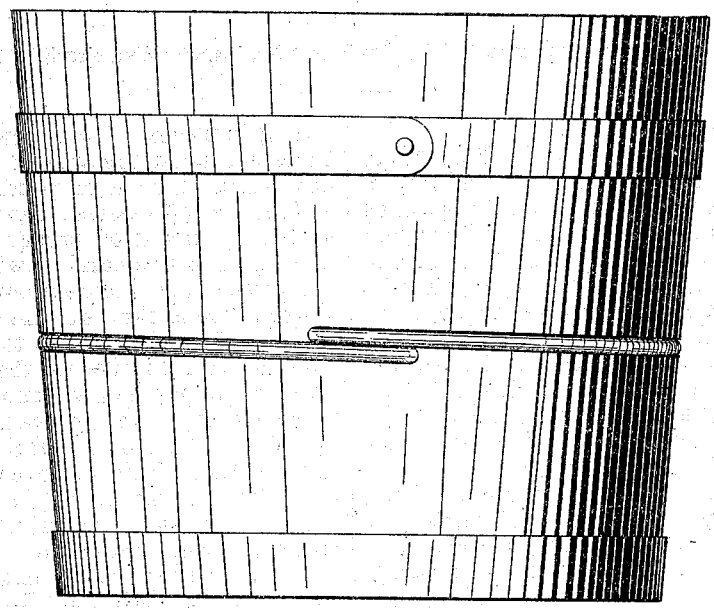
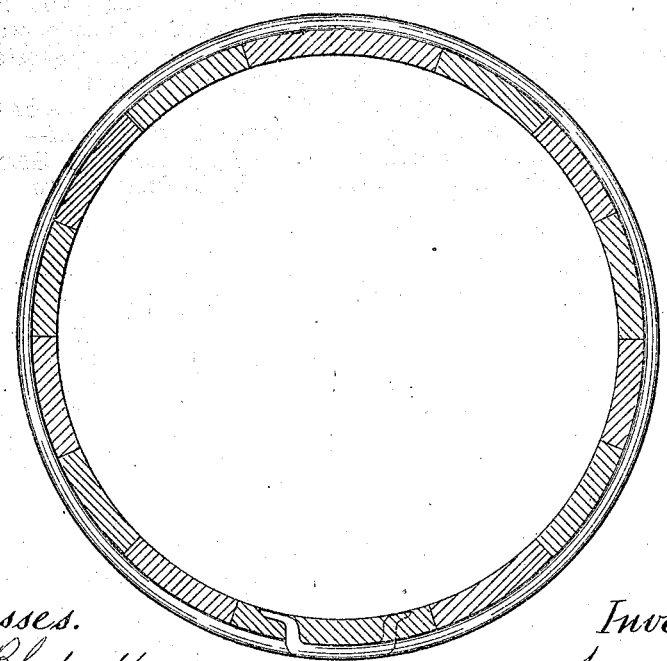
Witnesses.
W. H. Blodgett
L. J. Belt
Inventor.
Asa W. Ballou
per Edw. W. Donn

124,656

UNITED STATES PATENT OFFICE.

ASA W. BALLOU, OF ST. CHARLES, MICHIGAN.

IMPROVEMENT IN DOWEL-HOOPS FOR COOPERAGE.

Specification forming part of Letters Patent No. 124,656, dated March 19, 1872.

*To whom it may concern:*

Be it known that I, ASA W. BALLOU, of the village of St. Charles, in the county of Saginaw and State of Michigan, have invented a new and useful Improvement in Doweling Staves on all cooperage vessels, by means of an iron-wire hoop, and the method of using the same on such vessels, as more particularly hereinafter described; and I do declare that the following is a true and accurate description thereof, reference being had to the accompanying drawing, showing the application of the improvement herewith, and being a part of this specification.

All cooperage vessels, after having been used a short time, and then remaining empty and exposed to the action of the sun's rays or other heat, will shrink, and if great care is not exercised will, on removal or being disturbed, fall to pieces and become utterly worthless. The old method of doweling staves of cooperage vessels by means of wooden or iron pins is expensive, and therefore not practical. The object of this invention is to so construct cooperage vessels as to perfectly resist the action of the weather—that is to say, how much soever the parts may shrink, yet the vessel may be handled safely without falling to pieces. I will now explain, so that those skilled in the art can construct it. At any desirable point or points on the outside of the class of vessels I have heretofore mentioned, by means of proper machinery, I cut around, on a line parallel with the bottom of the vessel, one or more grooves, the depth of which is the thickness of the wire out of which the dowel-hoop is intended to be made. I then take the wire intended for the hoop, which has been properly prepared, and with machinery place it firmly in the groove around the vessel, and secure the ends by clinching on the inside of the vessel. This improvement is intended more particularly to apply to the class of cooperage vessels known in market as tubs, churns, buckets, water-pails, &c.

What I claim as my invention, and desire to secure by Letters Patent, is—

The wire dowel-hoop, with the manner of fastening the same, and the manner of applying the same to cooperage vessels made of any suitable material, substantially as and for the purposes set forth.

ASA W. BALLOU.

Signed in presence of—
VALLOROUS H. GROUT,
B. L. CLEVELAND.